United States Patent [19]
Lindler

[11] 3,820,801
[45] June 28, 1974

[54] COLLET ASSEMBLY

[75] Inventor: James Monroe Lindler, Lexington, S.C.

[73] Assignee: Columbia Products Company, Columbia, S.C.

[22] Filed: Nov. 26, 1971

[21] Appl. No.: 202,233

[52] U.S. Cl............... 279/48, 279/42, 403/371, 285/323, 43/23
[51] Int. Cl............................. A01k 87/02
[58] Field of Search............ 279/49, 69, 42, 43, 47, 279/48; 287/116, 52.06, 58 CT; 43/23; 285/323, 303; 403/368, 370, 371

[56] References Cited
UNITED STATES PATENTS

| 964,922 | 7/1910 | Lewthwaite | 279/49 |
| 1,918,359 | 6/1933 | Weis | 287/52.06 X |
| 2,242,305 | 5/1941 | Koehler et al. | 279/49 |
| 2,583,831 | 1/1952 | Goergen | 279/49 |
| 2,705,605 | 4/1955 | Kreissig et al. | 287/58 CT |
| 3,335,735 | 8/1967 | Colegrove et al. | 287/58 CT |
| 3,722,903 | 3/1973 | Jones | 287/58 CT |

FOREIGN PATENTS OR APPLICATIONS

| 1,261,974 | 4/1961 | France | 43/23 |
| 1,289,543 | 1962 | France | 287/52.06 |
| 125,026 | 3/1928 | Switzerland | 287/58 CT |

Primary Examiner—Andrew R. Juhasz
Assistant Examiner—Z. R. Bilinsky
Attorney, Agent, or Firm—Kenyon & Kenyon Reilly Carr & Chapin

[57] ABSTRACT

The fishing rod blade is provided with an annular recess to receive the split plastic collet while the foregrip and handle bores are sized to abut the ends of the collet to secure the collet and blade in place. The collet has tapered ends to facilitate circumferential squeezing of the collet as the foregrip is threaded onto the handle.

6 Claims, 4 Drawing Figures

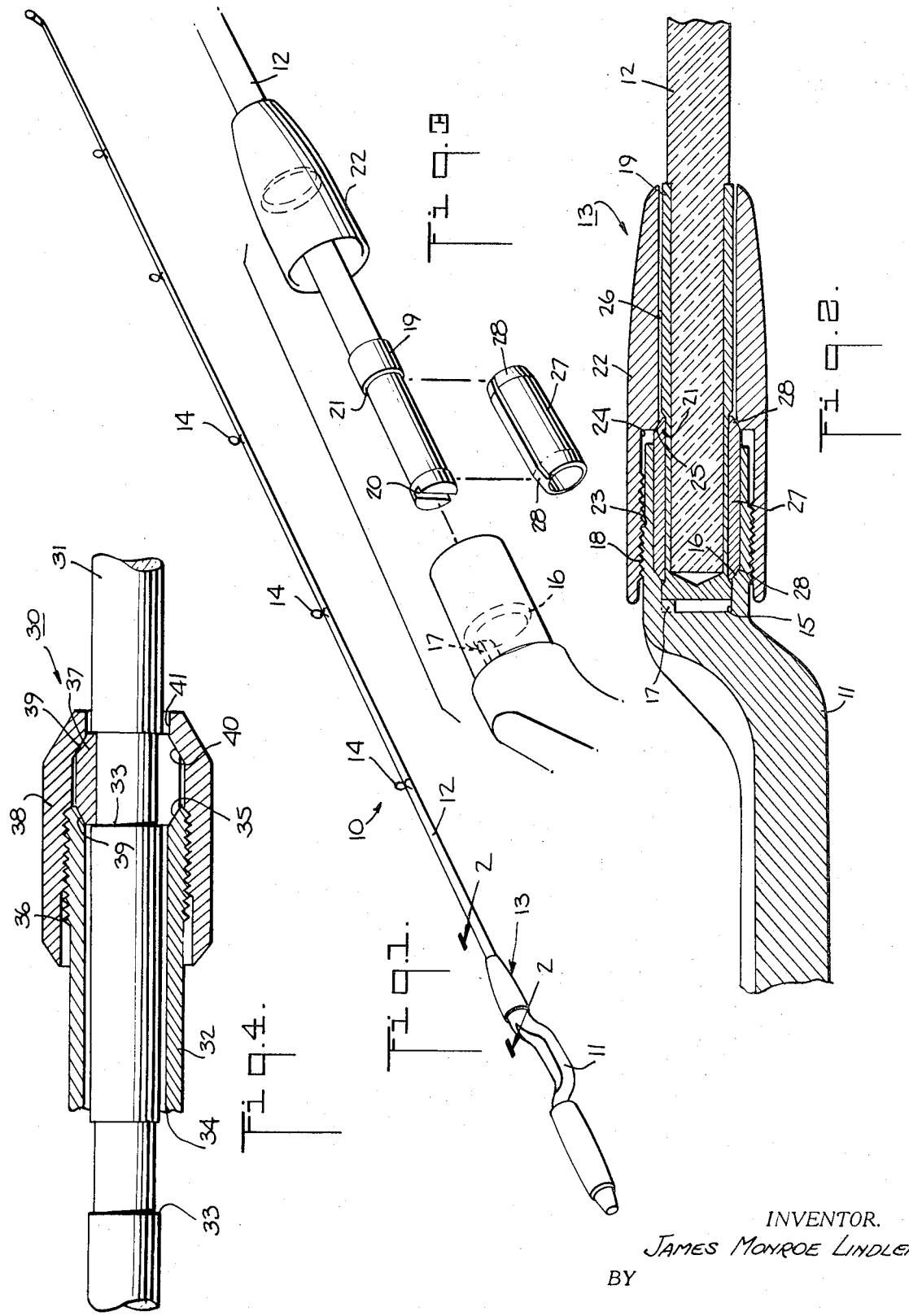

COLLET ASSEMBLY

This invention relates to a collet assembly for securing a pair of tubular means together. More particularly, this invention relates to a collet assembly for a fishing rod.

Heretofore, it has been known to construct fishing rods in a manner in which the various components of the fishing rod can be detached for transportation and secured together for use. For example, it has been known to construct a fishing rod with a handle and a blade which is slidably removable from the handle for collapsing of the rod into a compact package for transportation. In one such case, the handle has been provided with a bore to receive the blade as well as with a split collet which encompasses the blade and a foregrip which is threaded onto the handle to clamp the collet against the blade and, thus, secure the blade in the handle by a friction fit. However, in some cases, should the foregrip become loosened during use, for example, during casting, the clamping action of the collet on the blade can be loosened to such an extent that the blade can slip out of the handle. This not only requires re-insertion of the blade into the handle and tightening of the foregrip but also requires a fresh casting operation. Further, should a fish have been hooked in the meantime, there is a liklihood that the fish will have been lost before the blade can be resecured in the handle.

Accordingly, it is an object of this invention to provide for an efficient securement of a blade in a handle of a fishing rod construction.

It is another object of the invention to provide a simple efficient collet assembly.

It is another object of the invention to provide a collet assembly which utilizes a relatively few number of parts for securing one tubular means within a second tubular means in telescoping relation.

It is another object of the invention to provide a collet assembly for a fishing rod which utilizes conventional fishing rod components.

Briefly, the invention provides a collet assembly which utilizes a first tubular means having a bore therein, such as a fishing rod handle, a blade which is disposed within the bore of the handle, a second tubular means, such as a foregrip, which is mounted on the handle and at least one means which projects radially from the blade and is disposed in abutting relation with a portion of the handle at one end and a portion of the foregrip at the opposite end so as to secure the blade within the bore.

In one embodiment, the radially projecting means on the blade is provided by a collet of split construction which has tapered ends and which is located within an annular recess of the blade. This collet abuts against mating surfaces within the bore of the handle and within the foregrip so as to be circumferentially compressed upon movement of the foregrip axially of the handle such as by threading of the foregrip onto the handle.

In another embodiment, the collet assembly can be used to secure a sliding tube or rod in one of a number of extended positions within an outer tube. In this embodiment, the sliding tube includes a plurality of longitudinally spaced annular recesses, each of which is sized to receive a split collet as above. In addition, a member such as a knurled nut is threaded onto the outer tube so as to extend therefrom to abut the collet at one end while the outer tube abuts the other end of the collet. As above, the split collet is circumferentially compressed by threading of the nut onto the outer tube. In order to adjust the position of the slidable tube, the nut is threaded from the outer tube and the collet is moved to another recess in the slidable tube. Thereafter, the nut is again threaded onto the outer tube to secure the collet therebetween and thus the sliding tube is fixed in place.

These and other objects and advantages of the invention will become more apparent from the following detailed description and appended claims taken in conjunction with the accompanying drawings in which:

FIG. 1 illustrates a perspective view of a fishing rod incorporating a collet assembly according to the invention;

FIG. 2 illustrates a cross-sectional view taken on line II—II of FIG. 1;

FIG. 3 illustrates an exploded perspective view of the components of the collet assembly according to the invention; and FIG. 4 illustrates a view similar to FIG. 2 of a further embodiment of the invention.

Referring to FIG. 1, the fishing rod 10 is of the casting type which comprises a handle 11, a detachable blade or rod 12 and a collet assembly 13 to secure the blade 12 to the handle 11. As shown, the blade 12 has a number of fishing line guides 14 thereon.

Referring to FIG. 2, the handle 11 includes a bore 15 of circular cross section at one end, a tapered shouldered portion 16 near the bottom and a boss 17 which extends radially into the bore 15. In addition, the handle 11 is formed with a thread 18 about the outer periphery concentrically of the bore 15. The blade 12 includes a base portion 19, e.g. of metal and of cylindrical configuration which is sized to be slidably received within the bore 15 of the handle 11. This base portion 19 includes a transverse slot 20 in the bottom which is sized to receive the boss 17 of the handle 11 so as to locate the blade 12 in one of two positions relative to the handle 11. The base portion 19 also includes an annular recess 21 therein which is of a length to extend longitudinally out of the bore 15 of the handle 11 when in place. The ends of the recess 21 are both beveled on 45° angles for purposes as explained below.

The collet assembly 13 includes a hollow foregrip 22 of conventional construction which has a threaded portion 23 within an interior bore 24 to permit threading of the foregrip 22 onto the handle thread 18. In addition, a tapered mating portion 25 or shoulder is formed intermediately of the foregrip 22 which communicates the bore 24 with a counterbore 26 passing through the foregrip 22. The collet assembly 13 also includes a split collet 27, for example, of plastic material, which is received within the annular recess 21 of the blade 12. This collet 27 which is of cylindrical shape as shown includes ends 28 which are tapered or beveled on the exterior surface so as to matingly abut the tapered portions 16, 25 of the handle bore 15 and foregrip 22. The collet 27 is of uniform thickness, except for the split, as shown, between the tapered ends 28.

The collet 27 is of a length to extend over the length of the recess 21 so as to project out of the handle bore 15 and is of a thickness to project radially from the blade 12 into the plane of the shoulder 25 of the foregrip 22 and to abut against the tapered surfaces 16, 25 of the handle bore 15 and foregrip 22. The depth of the recess 21 and the thickness and resiliency of the collet 27 are related such that the collet 27 is loosely received and retained within the recess 21 before the blade 12 is fitted into the handle 11. For example, the recess 21 is of a depth of about 0.010 inches while the base portion has an outside diameter of 0.568 to 0.575 inches and the collet 27 has a free internal diameter of 0.572 inches.

In use, the foregrip 22 is normally mounted on the handle 11 with the collet 27 in place between the respective shouldered portions 16, 25 of the handle bore 15 and foregrip 22. In order to secure the blade 12 in the handle 11, the foregrip 22 is loosened so as to relieve any pressure on the collet 27. Next, the blade 12 is slid through the counterbore 26 of the foregrip 22 into the bore 15 of the handle 11. At this time, the blade portion 19 moves into the collet 27 and slightly expands the same. The blade 12 is then located by seating of the boss 17 of the handle 11 within the slot 20 of the blade 12. This permits the fishing line guides 14 on the blade 12 to be disposed in the proper manner. At the same time, the collet 27 snaps into place in the recess 21 of the base portion 19. Thereafter, the foregrip 22 is threaded on the handle 11 until being tightened against the collet 27. Continued threading causes the collet 27 to be circumferentially squeezed into the recess 21 to engage against the blade portion 19 throughout the length of the collet 27. The blade 12 is thus clamped in place.

Should the foregrip 22 become loosened during use, the collet 27 will retain the blade 12 in place due to the radial projection of the collet 27 through the plane of the counterbore 26 of the foregrip 22 and the penetration of the collet 27 into the recess 21 of the blade 12. To this end, the counterbore 26 of the foregrip 22 is of a diameter less than the outer diameter of the collet 27 when in place on the blade 12.

In order to remove the blade 12 from the handle 11, the foregrip 12 is loosened a sufficient amount to remove end pressure on the collet 27 and the blade 12 is pulled out from the handle 11. The bevelling on the ends of the recess 21 eliminates any tendency of the blade 12 to stick and assists in the extraction of the blade 12 when the collet 27 is loose but does not decrease the locking ability of the collet assembly 13 when the foregrip 22 is tightened on the collet 27. The blade 12 remains retained under a condition in which the foregrip 22 has been somewhat loosened, for example, up to one-half turn of the foregrip 22 on the handle 11.

Referring to FIG. 4, the collet assembly 30 can be used to adjustably mount a slidable tube or rod 31 within a second outer tube 32. For example, the collet assembly 30 can be used for a microphone stand or tripod so as to permit expansion of the height of the microphone or tripod.

In this embodiment, the slidable tube 31 has a plurality of annular recesses 33 arranged longitudinally thereof, each of which recess 33 may have beveled ends as above. Also, the outer tube 32 is provided with a hollow bore 34, a chamfered end 35 at the mouth of the tube 32 and a thread 36 on the outer periphery. In addition, the collet assembly 30 has a split insert or collet 37, as above described, located in one of the annular recesses 33 of the sliding tube 31, as well as a knurled nut 38 threaded onto the outer tube 32. The collet 37 has tapered ends 39 while the nut 38 includes a tapered portion 40 for engaging against a tapered end 39 of the collet 37. The nut 38 is sized with an opening 41 to permit passage of the sliding tube 31 while being of a diameter less than the outer diameter of the collet 37.

In use, in order to change the position of the slidable tube 31 relative to the support tube 32, e.g. to move the slidable tube 31 from the support tube 32, the nut 38 is loosed on the support tube 32 to relieve pressure on the collet 37. Next, the tube 31 is pulled from the support tube 32. At this time, as the collet 37 has expanded to a normal state due to the release of pressure thereon, the tube 31 also slides through the collet 37; any bevelling of the ends of the recess 33 assisting in extraction from the collet 37. The collet 37 thus remains located between the support tube 32 and the nut 38. When the next recess 33' of the tube 31 is brought within the collet 37 so that the collet 37 snaps into the recess 33' the nut 38 is tightened on the support tube 32 to squeeze the collet 37 against the tube 31. This fixes the tube 31 in the new adjusted position.

The invention thus provides a collet assembly which can be utilized to firmly secure a blade in place within a handle of a fishing rod in a simple efficient manner. Also, the invention provides a collet assembly which can be utilized in a multiplicity of embodiments to secure one tubular member within the bore of another tubular member, for example, in a telescoping joint for a tripod or microphone stand.

Further, the invention provides a collet assembly which allows a blade to be removed from a fishing rod handle without complete removal of the foregrip.

1. The combination of
a fishing rod handle having a bore therein at one end said bore including an axially extending inner surface;
a hollow foregrip mounted in concentric relation over said end of said handle in fixed relation thereto;
a split annular collet having a longitudinal outer surface disposed in said bore in abutting relation with a portion of said handle at one end and a portion of said foregrip at the opposite end said outer surface of the collet being in facing relation with said inner surface of said bore; and
a blade concentrically disposed within said bore and said foregrip, said blade having an annular recess receiving said collet therein, said collet being sized to be received and retained in said recess before said blade is fitted into said bore.

2. The combination as set forth in claim 1 wherein said collet is split longitudinally thereof.

3. The combination as set forth in claim 2 wherein said collet has a tapered portion at each said end thereof, and wherein said portion of said handle is tapered to mate with one of said tapered portions of said collet and said portion of said foregrip is tapered to mate with the other of said tapered portions of said collet.

4. The combination as set forth in claim 1 wherein said foregrip is threadably mounted on said handle and extends therefrom.

5. The combination as set forth in claim 1 wherein said collet is of cylindrical shape and engages said rod throughout the length of said collet.

6. The combination as set forth in claim 5 wherein said collet has tapered ends and is of uniform thickness between said ends.

* * * * *